(12) United States Patent
Park et al.

(10) Patent No.: US 9,897,051 B2
(45) Date of Patent: Feb. 20, 2018

(54) VARIABLE INTAKE SYSTEM

(71) Applicants: HYUNDAI MOTOR COMPANY, Seoul (KR); KIA MOTORS CORPORATION, Seoul (KR); PNTEC KOREA Co., Ltd., Hwaseong-si, Gyeonggi-do (KR)

(72) Inventors: Hyun Il Park, Yongin-Si (KR); Seong Hyuk Kang, Hwaseong-Si (KR)

(73) Assignees: Hyundai Motor Company, Seoul (KR); Kia Motor Corporation, Seoul (KR); PNTEC Korea Co., Ltd., Hwaseong-si, Gyeonggi-do (KR)

( * ) Notice: Subject to any disclaimer, the term of this patent is extended or adjusted under 35 U.S.C. 154(b) by 234 days.

(21) Appl. No.: 15/001,955

(22) Filed: Jan. 20, 2016

(65) Prior Publication Data
US 2017/0107956 A1    Apr. 20, 2017

(30) Foreign Application Priority Data
Oct. 20, 2015 (KR) .................. 10-2015-0146255

(51) Int. Cl.
*F02M 35/10*    (2006.01)

(52) U.S. Cl.
CPC *F02M 35/10262* (2013.01); *F02M 35/10072* (2013.01); *F02M 35/10091* (2013.01); *Y02T 10/146* (2013.01)

(58) Field of Classification Search
CPC ..... F02M 35/100262; F02M 35/10091; F02M 35/10072; F02M 35/12; F02M 35/112; F02M 35/10321; F02B 27/02
USPC .......... 123/184.42, 184.57, 184.56, 184.53
See application file for complete search history.

(56) References Cited

U.S. PATENT DOCUMENTS 4,907,547 A * 3/1990 Daly .................. F02B 27/0263
                                                    123/184.53
5,005,532 A * 4/1991 Shillington ............. F02B 27/00
                                                    123/184.42

FOREIGN PATENT DOCUMENTS

| JP | 1994-043217 U | 6/1994 |
| KR | 10-1998-053088 U | 9/1998 |
| KR | 10-2005-0120980 A | 12/2005 |
| KR | 10-2008-0042508 A | 5/2008 |

(Continued)

OTHER PUBLICATIONS

Office Action dated May 4, 2016, in realated Korean Patent Application No. 10-2015-0146255.

*Primary Examiner* — David Hamaoui
*Assistant Examiner* — Syed O Hasan
(74) *Attorney, Agent, or Firm* — McDermott Will & Emery LLP

(57) ABSTRACT

A variable intake system includes first runners, each including a first inlet formed at one side thereof to introduce air from a surge tank thereinto, a first valve formed at the first inlet, and a first outlet formed at the other side thereof to discharge the introduced air, and second runners, each including a second inlet formed at one side thereof to introduce air from the surge tank thereinto, a second valve formed at the second inlet, and a second outlet formed at the other side thereof, wherein an extension part branched from the second runner is formed at the second runner, a third inlet is formed at the end of the extension part, and the total length of the second runner provided with the extension part is longer than the total length of the first runner.

8 Claims, 5 Drawing Sheets

(56) References Cited

FOREIGN PATENT DOCUMENTS

KR    10-2009-0017813 A    2/2009

* cited by examiner

VARIABLE INTAKE SYSTEM

CROSS-REFERENCE TO RELATED APPLICATION

This application claims the benefit of priority to Korean Patent Application No. 10-2015-0146255, filed on Oct. 20, 2015 with the Korean Intellectual Property Office, the disclosure of which is incorporated herein by reference.

TECHNICAL FIELD

The present disclosure relates to an intake system of a vehicle engine, and more particularly, to a variable intake system which may adjust an intake air quantity supplied to an engine according to revolution bands of the engine.

BACKGROUND

In general, when a vehicle engine is driven, air and fuel needs to be properly supplied to a combustion chamber so that a vehicle is driven as needed by a user. Particularly, as fuel efficiency is now an important issue, a method of increasing fuel efficiency while driving a vehicle with adequate performance is required.

In order to satisfy such requirements, a variable intake system is conventionally mounted in an engine. In such a variable intake system, inlet resistance varies according to revolution bands of an engine and thus directly influences performance of the engine.

As exemplarily shown in FIG. 1, a conventional variable intake system includes an intake manifold including long runners 50, short runners 30 and outlets 70, and valves opened and closed by actuators 90 in the intake manifold.

The operating process of the conventional variable intake system will be described. Air at the outside of a vehicle is introduced into a surge tank 10, the variable intake valve is closed by the actuator 90 (in a state 53), sucked air moves a relatively long distance 50 and, thus, air in the surge tank 10 is provided to a combustion chamber (not shown) through the outlet 70, if the speed of the vehicle is less than a designated speed (at a low or middle speed). The variable intake valve is opened by the actuator (in a state 33), sucked air moves a relatively short distance 30 and, thus, air in the surge tank 10 is supplied to the combustion chamber (not shown) through the outlet 70, if the speed of the vehicle exceeds the designated speed (at a high speed).

However, in this case, since one suction passage and one outlet are used both at a low or middle speed and at a high speed, the cross-section of the suction passage is not changed and thus it is difficult to provide air at a proper amount at a proper speed required according to speeds of the vehicle.

The above description has been provided to aid in understanding of the background of the present disclosure and should not be interpreted as conventional technology known to those skilled in the art.

SUMMARY OF THE DISCLOSURE

Therefore, the present disclosure has been made in view of the above problems, and it is an object of the present disclosure to provide a variable intake system in which an air flow passage and the cross-sectional area of the air flow passage are varied according to speeds of a vehicle so as to increase performance of the vehicle and to improve fuel efficiency.

In accordance with the present disclosure, the above and other objects can be accomplished by the provision of a variable intake system including first runners, each including a first inlet formed at one side thereof to introduce air from a surge tank thereinto, a first valve formed at the first inlet to open or close the first inlet, and a first outlet formed at the other side thereof to discharge the introduced air, second runners, each including a second inlet formed at one side thereof to introduce air from the surge tank thereinto, a second valve formed at the second inlet to open or close the second inlet, and a second outlet formed at the other side thereof to discharge the introduced air, wherein an extension part branched from the second runner is formed at the second runner, a third inlet is formed at the end of the extension part to introduce air from the surge tank thereinto, and the total length of the second runner provided with the extension part is relatively longer than the total length of the first runner.

The first runner and the second runner may form a pair and be connected to one inflow hole and, thus, when the first valve and the second valve are opened, air may be introduced from the surge tank through the first inlet and the second inlet and supplied to the inflow hole.

A plurality of first runners and a plurality of second runners may come in pairs and be alternately disposed.

The cross-sectional area of the first runner may be smaller than the cross-sectional area of the second runner.

The first inlet may be combined with the side surface of the surge tank and discharge air introduced from the surge tank to the inflow hole through the first outlet, when the first valve is opened.

The second inlet may be combined with the side surface of the surge tank and discharge air introduced from the surge tank to the inflow hole through the second outlet, when the second valve is opened.

The third inlet may be combined with the lower surface of the surge tank and discharge air introduced from the surge tank to the inflow hole through the second outlet, when the second valve is closed.

The first valve and the second valve may be provided on one rotary shaft so as to be simultaneously opened and closed, and the first valve and the second valve may be opened so that air moves along a relatively short distance, when the speed of a vehicle is less than a designated speed, and closed so that air is introduced only through the third inlet and moves along a relatively long distance, when the speed of the vehicle exceeds the designated speed.

The first valve and the second valve may be located on the same straight line so as to be simultaneously opened and closed by one rotary shaft, and the first valve and the second valve may be opened so that air moves along a relatively short distance, when the speed of a vehicle is less than a designated speed, and closed so that air is introduced only through the third inlet and moves along a relatively long distance, when the speed of the vehicle exceeds the designated speed.

The first valve and the second valve may be butterfly valves.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Hereinafter, a variable intake system in accordance with one embodiment of the present disclosure will be described with reference to the accompanying drawings.

Figure 1:
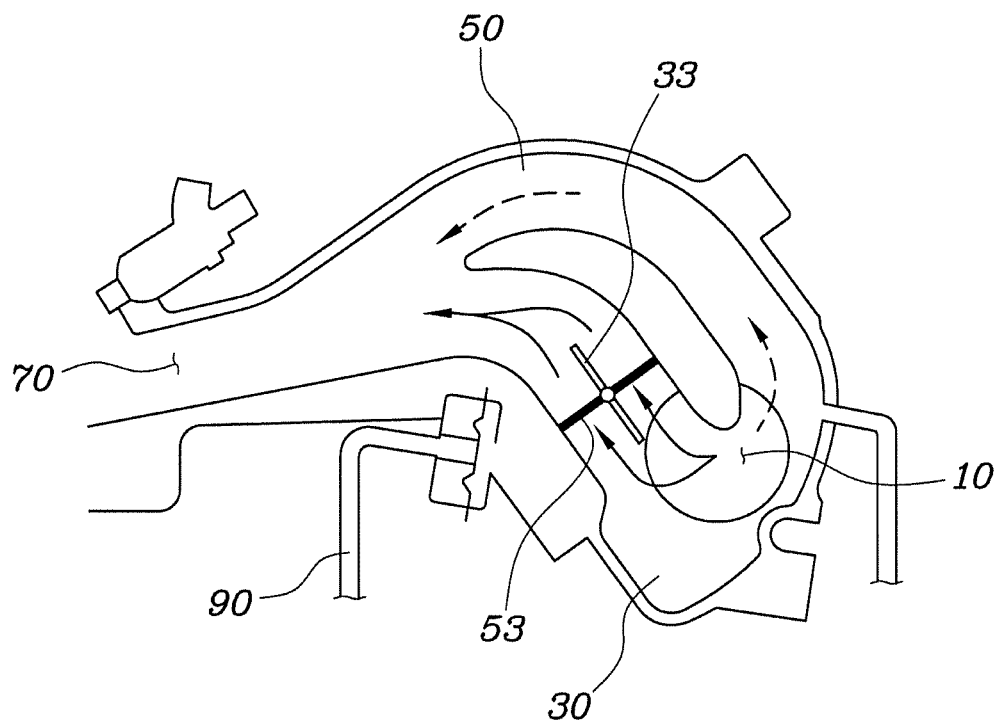
FIG. 1 is a view illustrating a conventional variable intake system.
Figure 2:
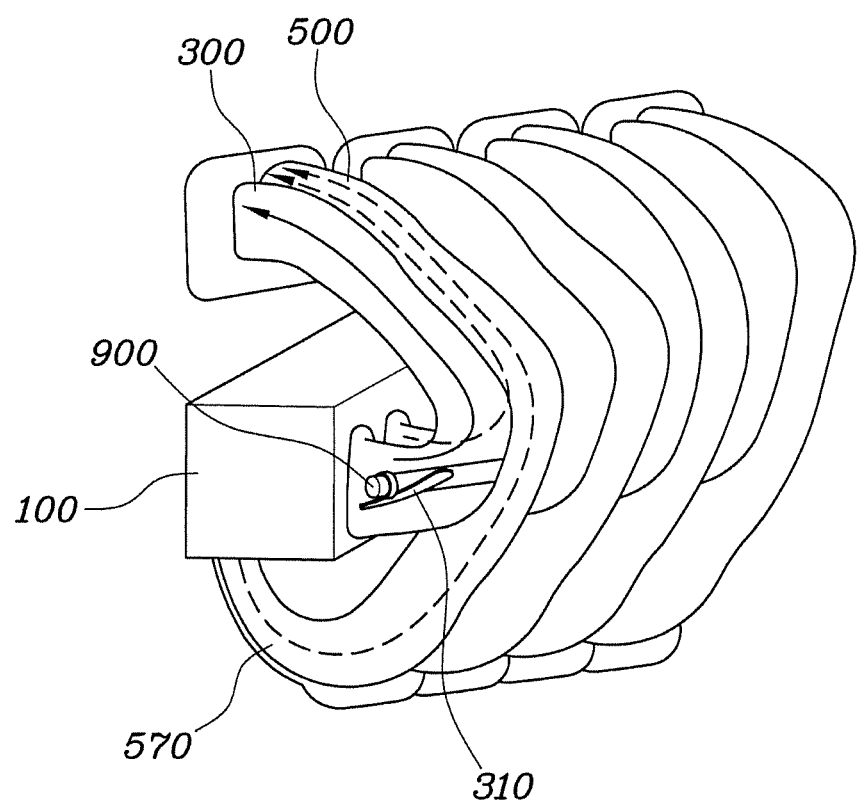
FIGS. 2 and 3 are views illustrating a variable intake system in accordance with one embodiment of the present disclosure and operation thereof.
Figure 3:
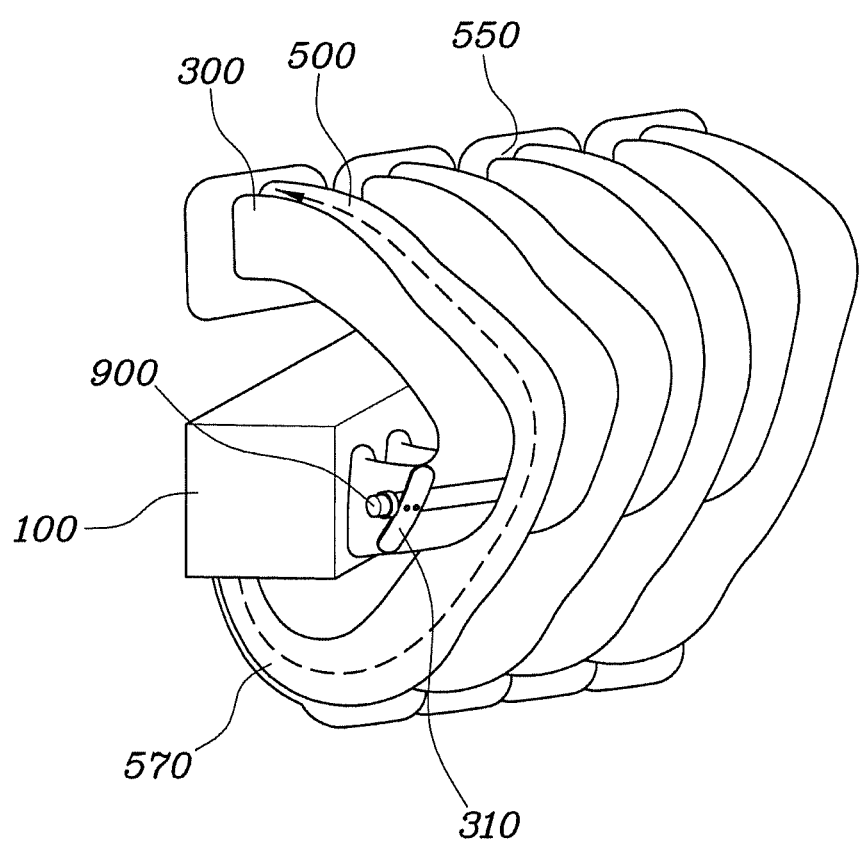
Figure 4:
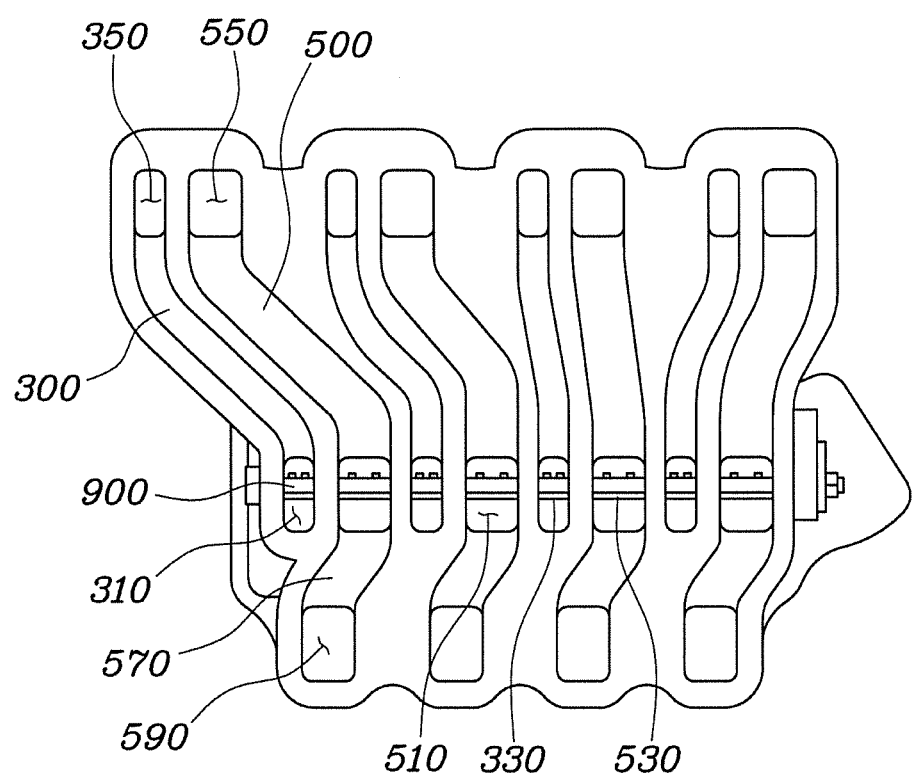
FIGS. 4 and 5 are views illustrating opening and closing of valves.
Figure 5:
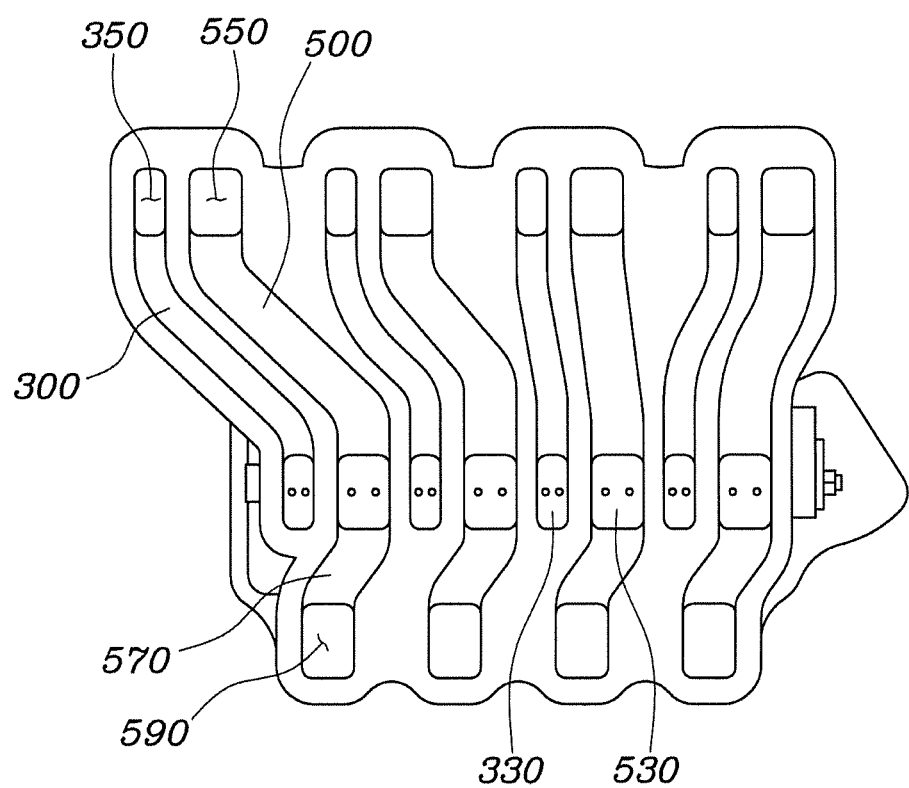

FIGS. 2 and 3 are views illustrating a variable intake system in accordance with one embodiment of the present disclosure and operation thereof, and FIGS. 4 and 5 are views illustrating opening and closing of valves.

A variable intake system in accordance with one embodiment of the present disclosure includes first runners 300, each of which includes a first inlet 310 formed at one side thereof to introduce air from a surge tank 100 thereinto, a first valve 330 formed at the first inlet 310 to open or close the first inlet 310, and a first outlet 350 formed at the other side thereof to discharge the introduced air, and second runners 500, each of which includes a second inlet 510 formed at one side thereof to introduce air from the surge tank 100 thereinto, a second valve 530 formed at the second inlet 510 to open or close the second inlet 510, and a second outlet 550 formed at the other side thereof to discharge the introduced air, an extension part 570 branched from the second runner 500 is formed at the second runner 500. Additionally, a third inlet 590 is formed at the end of the extension part 570 to introduce air from the surge tank 100 thereinto, and the total length of the second runner 500 provided with the extension part 570 is relatively longer than the total length of the first runner 300.

Further, the first valve 330 and the second valve 530 may be butterfly valves. The first valve 330 and the second valve 530 may be provided on one rotary shaft 900 and, particularly, the first valve 330 and the second valve 530 may be located on the same straight line so as to be simultaneously opened and closed by the rotary shaft 900. The first valve 330 and the second valve 530 may be controlled by a controller (not shown) and separate actuators (not shown) may be provided.

That is, the variable intake system supplies air introduced into the surge tank 100 to a combustion chamber (not shown) of a cylinder head (not shown) through an inflow hole (not shown). Here, the controller judges the speed of the vehicle and opens or closes the first valves 330 and the second valves 530 according to whether or not the speed of the vehicle is less than a designated speed (the vehicle is driven at a middle or low speed) or exceeds the designated speed (the vehicle is driven at a high speed).

Hereinafter, the configuration and operation of the variable intake system will be described in more detail with reference to FIGS. 2 to 4.

FIGS. 2 and 4 are views illustrating a case where the vehicle is driven at a high speed and FIGS. 3 and 5 are views illustrating a case where the vehicle is driven at a middle or low speed. Here, a reference speed value of the vehicle input in advance to the controller may be varied according to environments and designs. In the present disclosure, it is judged that the vehicle is driven at a middle or low speed if the speed of the vehicle is less than 3000 revolutions per minute (RPM) and that the vehicle is driven at a high speed if the speed of the vehicle exceeds 3000 RPM.

In the variable intake system in accordance with the present disclosure, the first runner 300 having a relatively short length and the second runner 500 having a relatively long length form a pair and are connected to one inflow hole. Therefore, when the first valve 330 and the second valve 530 are opened, air introduced into the surge tank 100 is supplied to the combustion chamber via the inflow hole through the first inlet 310 and the second inlet 510. Particularly, as exemplarily shown in FIGS. 2 to 5, a plurality of first runners 300 and a plurality of second runners 500 come in pairs and the first runners 300 and the second runners 500 are alternately disposed.

Further, the first inlet 310 is combined with the side surface of the surge tank 100 and discharges air introduced from the surge tank 100 to the inflow hole through the first outlet 350 when the first valve 330 is opened. Therefore, the first runner 300 has a relatively short air flow passage. In the same manner, the second inlet 510 is combined with the side surface of the surge tank 100 and discharges air introduced from the surge tank 100 to the inflow hole through the second outlet 550 when the second valve 530 is opened. Therefore, the air flow passage of the second runner 500 in which air is introduced into the second inlet 510 and then discharged to the second outlet 550 may have a similar length to the length of the air flow passage of the first runner 300. However, the third inlet 590 is combined with the lower surface of the surge tank 100 and discharges air introduced from the surge tank 100 to the inflow hole through the second outlet 550 when the second valve 530 is closed, and an air flow passage formed from the third inlet 590 to the second outlet 550 has a greater length than the length of the air flow passage formed from the first inlet 310 to the first outlet 350 and the air flow passage formed from the second inlet 510 to the second outlet 550.

Therefore, when the vehicle is driven at a low or middle speed, the first valves 330 and the second valves 530 are closed, and air in the surge tank 100 is introduced only into the third inlets 590 and thus moves within the second runners 500 along a relatively long distance and, when the vehicle is driven at a high speed, the first valves 330 and the second valves 530 are opened and air moves within the first runners 300 and the second runners 500 along a relatively short distance.

That is, the second runner 500 includes two branched inlets 510 and 590 having different lengths and one outlet 550 and thus, the length of the air flow passage may be varied according to speeds of the vehicle. Therefore, when the vehicle is driven at a high speed, both the first valves 330 and the second valves 530 are opened, and air in the surge tank 100 is supplied through the first inlets 310 and the second inlets 510. Further, since the third inlets 590 are not closed, air may be supplied also through the third inlets 590. Therefore, air may be supplied to the combustion chamber using both the flow passages having a relatively short length and the flow passages having a relatively long length and thus, the amount of air supplied to the combustion chamber may be increased and high speed torque may be increased.

On the other hand, when the vehicle is driven at a low or middle speed, both the first valves 330 and the second valves 530 are closed and air in the surge tank 100 is supplied to the combustion chamber only through the third inlets 590, which are opened, and thus moves along the relatively long flow passages. Therefore, while air passes through the relatively long flow passages, a Helmholtz resonance effect is formed and low or middle speed torque is improved.

Through the above-described configuration, when the vehicle is driven at a high speed, in order to reduce inlet resistance, the intake manifold has an increased diameter and a decreased length and the amount of air introduced into the combustion chamber is increased, thereby allowing air to be supplied to the combustion chamber using an inertial effect caused by the flow of air, even after a piston has passed by a bottom dead center point, and acquiring high output.

On the other hand, when the vehicle is driven at a low or middle speed, the intake manifold has a decreased diameter and an increased length and the flow velocity in the intake manifold is increased, thereby allowing the air flow to become rapid due to a resonance effect, improving the density of intake air to maximize the amount of air supplied to the combustion chamber and increasing torque at the low or middle speed. Such resonance effect is a Helmholtz resonance effect ($w=(a^2 A/(VL))^{1/2}$).

As is apparent from the above description, in order to solve a difficulty in acquiring effects required at a high speed and a low or middle speed using one intake manifold, a variable intake system of the present disclosure may include an intake manifold including both flow passages having a large diameter and a short length and flow passages having a small diameter and a long length while maintaining a conventional layout. Particularly, the cross-sectional area of second runners having a relatively long length may be decreased and intake tuning RPM may be lowered, thereby improving low or middle speed torque.

Therefore, the variable intake system of the present disclosure may adjust the required amount of air according to driving speeds of a vehicle when air is sucked according to driving of the vehicle and, thus, improve low or middle speed torque using intake inertia at the low or middle speed of the vehicle and increase torque at the high speed of the vehicle, thereby improving fuel efficiency while using a conventional layout.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A variable intake system, comprising: first runners, each including a first inlet formed at one side thereof to introduce air from a surge tank thereinto, a first valve formed at the first inlet to open or close the first inlet, and a first outlet formed at the other side thereof to discharge the introduced air; and second runners, each including a second inlet formed at one side thereof to introduce air from the surge tank thereinto, a second valve formed at the second inlet to open or close the second inlet, and a second outlet formed at the other side thereof to discharge the introduced air, wherein an extension part branched from the second runner is formed at the second runner, a third inlet is formed at the end of the extension part to introduce air from the surge tank thereinto, and the total length of the second runner provided with the extension part is longer than the total length of the first runner, wherein a plurality of first runners and a plurality of second runners come in pairs, the first runners and the second runners being alternately disposed, and wherein a cross-sectional area of the first runners are smaller than a cross-sectional area of the second runners.

2. The variable intake system according to claim 1, wherein the first runner and the second runner form a pair and are connected to one inflow hole and thus, when the first valve and the second valve are opened, air is introduced from the surge tank through the first inlet and the second inlet and supplied to the inflow hole.

3. The variable intake system according to claim 1, wherein the first inlet is combined with a side surface of the surge tank and discharges air introduced from the surge tank to an inflow hole through the first outlet when the first valve is opened.

4. The variable intake system according to claim 1, wherein the second inlet is combined with a side surface of the surge tank and discharges air introduced from the surge tank to an inflow hole through the second outlet when the second valve is opened.

5. The variable intake system according to claim 1, wherein the third inlet is combined with a lower surface of the surge tank and discharges air introduced from the surge tank to an inflow hole through the second outlet when the second valve is closed.

6. The variable intake system according to claim 1, wherein the first valve and the second valve are provided on one rotary shaft so as to be simultaneously opened and closed, and the first valve and the second valve are opened so that air moves along a relatively short distance when the speed of a vehicle is less than a designated speed, and closed so that air is introduced only through the third inlet and moves along a relatively long distance when the speed of the vehicle exceeds the designated speed.

7. The variable intake system according to claim 1, wherein the first valve and the second valve are located on the same straight line so as to be simultaneously opened and closed by one rotary shaft, and the first valve and the second valve are opened so that air moves along a relatively short distance when the speed of a vehicle is less than a designated speed, and closed so that air is introduced only through the third inlet and moves along a relatively long distance when the speed of the vehicle exceeds the designated speed.

8. The variable intake system according to claim 1, wherein the first valve and the second valve are butterfly valves.

* * * * *